US012693906B2

(12) United States Patent
Lee et al.

(10) Patent No.: US 12,693,906 B2
(45) Date of Patent: Jul. 28, 2026

(54) CONTAINER MANAGEMENT DEVICE AND STORAGE MEDIUM STORING CONTAINER MANAGEMENT PROGRAM

(71) Applicants: Chunghan Lee, Chiyoda-ku (JP); Byoungkwon Choi, Daejeon (KR); Jinwoo Park, Daejeon (KR); Dongsu Han, Daejeon (KR)

(72) Inventors: Chunghan Lee, Chiyoda-ku (JP); Byoungkwon Choi, Daejeon (KR); Jinwoo Park, Daejeon (KR); Dongsu Han, Daejeon (KR)

(73) Assignees: TOYOTA JIDOSHA KABUSHIKI KAISHA, Toyota (JP); KOREA ADVANCED INSTITUTE OF SCIENCE AND TECHNOLOGY, Yuseong-gu (KR)

( * ) Notice: Subject to any disclaimer, the term of this patent is extended or adjusted under 35 U.S.C. 154(b) by 529 days.

(21) Appl. No.: 17/745,069

(22) Filed: May 16, 2022

(65) Prior Publication Data

US 2022/0374268 A1 Nov. 24, 2022

(30) Foreign Application Priority Data

May 18, 2021 (JP) ................................. 2021-084145

(51) Int. Cl.
*G06F 9/50* (2006.01)
(52) U.S. Cl.
CPC ............ *G06F 9/505* (2013.01); *G06F 9/5016* (2013.01)

(58) Field of Classification Search
CPC ......................................... G06F 9/45533–5083
See application file for complete search history.

(56) References Cited

U.S. PATENT DOCUMENTS 10,402,733 B1 * 9/2019 Li .......................... G06N 20/20
12,231,304 B2 * 2/2025 Illikkal ............... H04L 41/5019
(Continued)

OTHER PUBLICATIONS

Predicting the End-to-End Tail Latency of Containerized Microservices in the Cloud Joy Rahman and Palden Lama (Year: 2019).*
(Continued)

*Primary Examiner* — April Y Blair
*Assistant Examiner* — Paul V Mills
(74) *Attorney, Agent, or Firm* — Dinsmore & Shohl LLP

(57) ABSTRACT

A container management device including a processor, wherein the processor is configured to acquire, for a service including interconnected respective microservices installed with containers for executing processing, a workload relating to the service, connection information that is information relating to how the microservices are interconnected, and a service chain for propagation of respective processing related to the workload across the microservices; employ a prediction model expressing a relationship between a workload of each of the microservices and a resource usage to find a resource usage of each of the microservices from the acquired workload, the acquired connection information, and the acquired service chain, and to predict a number of containers; and control container installation at a same moment for the respective microservices by installation with the predicted number of containers for each of the microservices.

7 Claims, 7 Drawing Sheets

(56)  References Cited

U.S. PATENT DOCUMENTS

| | | | | |
|---|---|---|---|---|
| 2009/0235268 | A1* | 9/2009 | Seidman | G06F 11/3466 |
| | | | | 718/104 |
| 2010/0174514 | A1* | 7/2010 | Melkumyan | G06F 17/18 |
| | | | | 703/2 |
| 2013/0007753 | A1* | 1/2013 | Jain | G06F 9/4881 |
| | | | | 718/103 |
| 2014/0282591 | A1* | 9/2014 | Stich | G06F 9/5027 |
| | | | | 718/104 |
| 2016/0080908 | A1* | 3/2016 | Julian | H04W 4/023 |
| | | | | 455/457 |
| 2018/0316759 | A1* | 11/2018 | Shen | H04L 67/51 |
| 2018/0349168 | A1* | 12/2018 | Ahmed | G06F 11/3433 |
| 2019/0347134 | A1* | 11/2019 | Zhuo | G06N 5/02 |
| 2020/0259715 | A1* | 8/2020 | Schermann | H04L 67/51 |
| 2020/0364035 | A1* | 11/2020 | White | G06F 9/547 |
| 2022/0060526 | A1* | 2/2022 | Jónsson | H04L 67/306 |
| 2022/0164186 | A1* | 5/2022 | Pamidala | G06F 18/2155 |

OTHER PUBLICATIONS

Robust Resource Scaling of Containerized Microservices with Probabilistic Machine learning Peng Kang and Palden Lama (Year: 2020).*

Gaussian process for predicting CPU utilization and its application to energy efficiency Dinh-Mao Bui, Huu-Quoc Nguyen, Yonglk Yoon, Sunglk Jun, Muhammad Bilal Amin, Sungyoung Lee (Year: 2015).*

Modelling and Managing Deployment Costs of Microservice-Based Cloud Applications Philipp Leitner and Jürgen Cito, Emanuel Stöckli (Year: 2016).*

Resource Allocation Based on Workflow for Enhancing the Performance of Composite Service BangYu Wu, Chi-Hung Chi, Zhe Chen (Year: 2007).*

A Holistic Auto-Scaling Algorithm for Multi-Service Applications Based on Balanced Queuing Network Jingwan Tong, Mingchang Wei, Maolin Pan and Yang Yu (Year: 2021).*

PHPA: A Proactive Autoscaling Framework for Microservice Chain Jinwoo Park, Byungkwon Choi, Chunghan Lee, Dongsu Han (Year: 2021).*

Graf: A Graph Neural Network based Proactive Resource Allocation Framework for SLO-Oriented Microservices Jinwoo Park, Byungkwon Choi, Chunghan Lee, Dongsu Han (Year: 2021).*

Autoregressive Integrated Moving Average (ARIMA)—Interpreting data and make future predictions using time-series analysis and statistical analysis CFI Team; corporatefinanceinstitute.com/resources/data-science/autoregressive-integrated-moving-average-arima/ (Year: 2022).*

Understanding ARIMA (Time Series Modeling) Using the Past in an Attempt to Forecast the Future Tony Yiu towardsdatascience.com/understanding-arima-time-series-modeling-d99cd11be3f8/ (Year: 2020).*

Burst-Aware Predictive Autoscaling for Containerized Microservices Muhammad Abdullah, Waheed Iqbal, Josep Lluis Berral, Jorda Polo, and David Carrera (Year: 2020).*

Chamulteon: Coordinated Auto-Scaling of Micro-Services Andre Bauer, Veronika Lesch, Laurens Versluis, Alexey Ilyushkin, Nikolas Herbst, and Samuel Kounev (Year: 2019).*

A Holistic Machine Learning-Based Autoscaling Approach for Microservice Applications Alireza Goli, Nima Mahmoudi, Hamzeh Khazaei and Omid Ardakanian (Year: 2021).*

Predictive Autoscaling of Microservices Hosted in Fog Microdata Center Muhammad Abdullah, Waheed Iqbal, Arif Mahmood, Faisal Bukhari, and Abdelkarim Erradi (Year: 2020).*

Sizing and Coordinated Scaling of Microservices Preyashi Agarwal and J. Lakshmi (Year: 2020).*

"Horizontal Pod Autoscaling", Kubernetes. Last modified Mar. 28, 2022, URL; https://kubernetes.io/docs/tasks/run-application/horizontal-pod-autoscale/.

* cited by examiner

CONTAINER MANAGEMENT DEVICE AND STORAGE MEDIUM STORING CONTAINER MANAGEMENT PROGRAM

CROSS-REFERENCE TO RELATED APPLICATION

This application is based on and claims priority under 35 USC 119 from Japanese Patent Application No. 2021-084145 filed on May 18, 2021, the disclosure of which is incorporated by reference herein.

BACKGROUND

Technical Field

The present disclosure relates to a container management device and a storage medium storing a container management program.

Related Art

As related art there is a proposal for technology with Kubernetes that performs processing to control a resource amount for microservices by dynamically reducing or increasing containers (pods) to match a workload (processing load) of resources for respective microservices (for example, Kubernetes (https://kubernetes.io/docs/tasks/run-application/horizontal-pod-autoscale/)).

In Kubernetes, a threshold is set for workload of resources for respective microservices, and control is performed to increase the amount of resource by installing more containers for each microservice when the workload exceeds the threshold.

However, recently services are being provided in which microservices installed with respective applications are connected together, and processing is coordinated across the interconnected microservices. In such a service processing is performed while the workload is propagating across the microservices.

However in Kubernetes, due to instalsling more containers to match workload generated in the microservices, it takes time for workload to propagate to the final microservice in cases in which there is a sudden change in workload, and sometimes workload in the respective microservices is not able to be immediately ascertained. Such a service accordingly not able to immediately allocate the appropriate amount of resource to each of the microservices, and a drop in the service quality (QoS: Quality of Service) of the overall service is not always been able to be suppressed.

SUMMARY

An object of the present disclosure is to provide a container management device capable of suppressing a drop in service quality of the overall service even in cases in which there is a sudden change in workload, and to provide a storage medium storing a container management program with the same capability.

A first aspect is a container management device including an acquisition section, a prediction section, and a control section. The acquisition section acquires, for a service including interconnected respective microservices installed with containers for executing processing, a workload relating to the service, connection information that is information relating to how the microservices are interconnected, and a service chain for propagation of respective processing related to the workload across the microservices. The prediction section employs a prediction model expressing a relationship between a workload of each of the microservices and a resource usage to find a resource usage of each of the microservices from the acquired workload, the acquired connection information, and the acquired service chain, and to predict a number of containers. The control section controls container installation at the same moment for the respective microservices by installation with the predicted number of containers for each of the microservices.

In the container management device, the acquisition section acquires the workload relating to the service, the connection information relating to how the microservices are interconnected, and the service chain for propagation of the workload. In the container management device the prediction section employs the prediction model expressing the relationship between the workload of each of the microservices and the resource usage to find the resource usage from the workload according to the service, the connection information, and the service chain, and predicts the number of containers. In the container management device the control section controls container installation at the same moment for the respective microservices by installation with the predicted number of containers.

The container management device enables a drop in service quality of the overall service to be suppressed even in cases in which there is a sudden change in workload.

A container management device of a second aspect is the container management device of the first aspect, wherein the acquisition section further acquires resource information that is information regarding the historical workload and the resource usage for each of the microservices. The container management device further includes a model generation section that employs the resource information to generate the prediction model.

In the container management device of the second aspect resource information is further acquired, this being the historical workload and resource usage for each of the microservices, and the model generation section employs the resource information to generated the prediction model. The container management device is thereby able to install containers based on the historical workload.

A container management device of a third aspect is the container management device of the second aspect wherein the prediction model is a predetermined regression model, or is a regression model determined by Gaussian process.

The container management device of the third aspect enables the resource usage in each of the microservices to be predicted.

A container management device of a fourth aspect is the container management device of the third aspect wherein the model generation section is configured to select a predetermined regression model or a regression model determined by Gaussian process according to an amount of data in the resource information.

The container management device of the fourth aspect enables a high accuracy prediction model to be selected according to the data amount of the historical workload.

A container management device of a fifth aspect is the container management device of any one of the first to fourth aspect wherein the prediction section is configured to identify from the service chain which microservices processing will propagate through, estimate the workload for each of the microservices, and employ the prediction model to find the resource usage from the workload estimated for each of the microservices.

The container management device of the fifth aspect enables container installation to be performed in consideration of the interconnection relationships between the microservices.

Effects

The present disclosure enables a drop in service quality of the overall service to be suppressed even in cases in which there is a sudden change in workload.

BRIEF DESCRIPTION OF THE DRAWINGS

An exemplary embodiment of the present disclosure will be described in detail based on the following figures, wherein.

DETAILED DESCRIPTION

Detailed explanation follows regarding examples of modes to implement the present disclosure, with reference to the drawings. The present disclosure relates to a container management device 10 that performs control to substantially simultaneously install (scale-out) containers for processing execution in microservices of an overall service so as to correspond to workloads (processing loads) generated in the service. Note that a container according to the present exemplary embodiment is an application execution environment with plural subdivided and allocated resources, such as server memory, CPUs, and the like. Note that "substantially simultaneously" according to the present exemplary embodiment is an example of "at the same moment".

Figure 1:
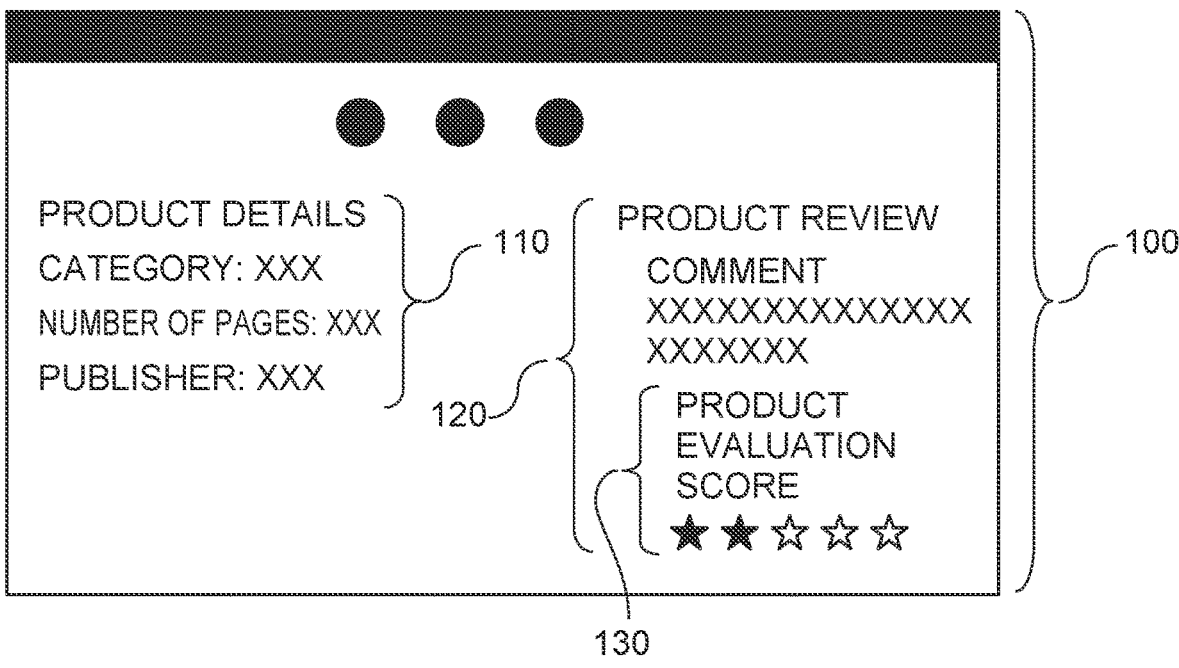
FIG. 1 is a face-on view illustrating an example of a screen to provide a service configured by plural microservices according to the present exemplary embodiment.
Figure 2:
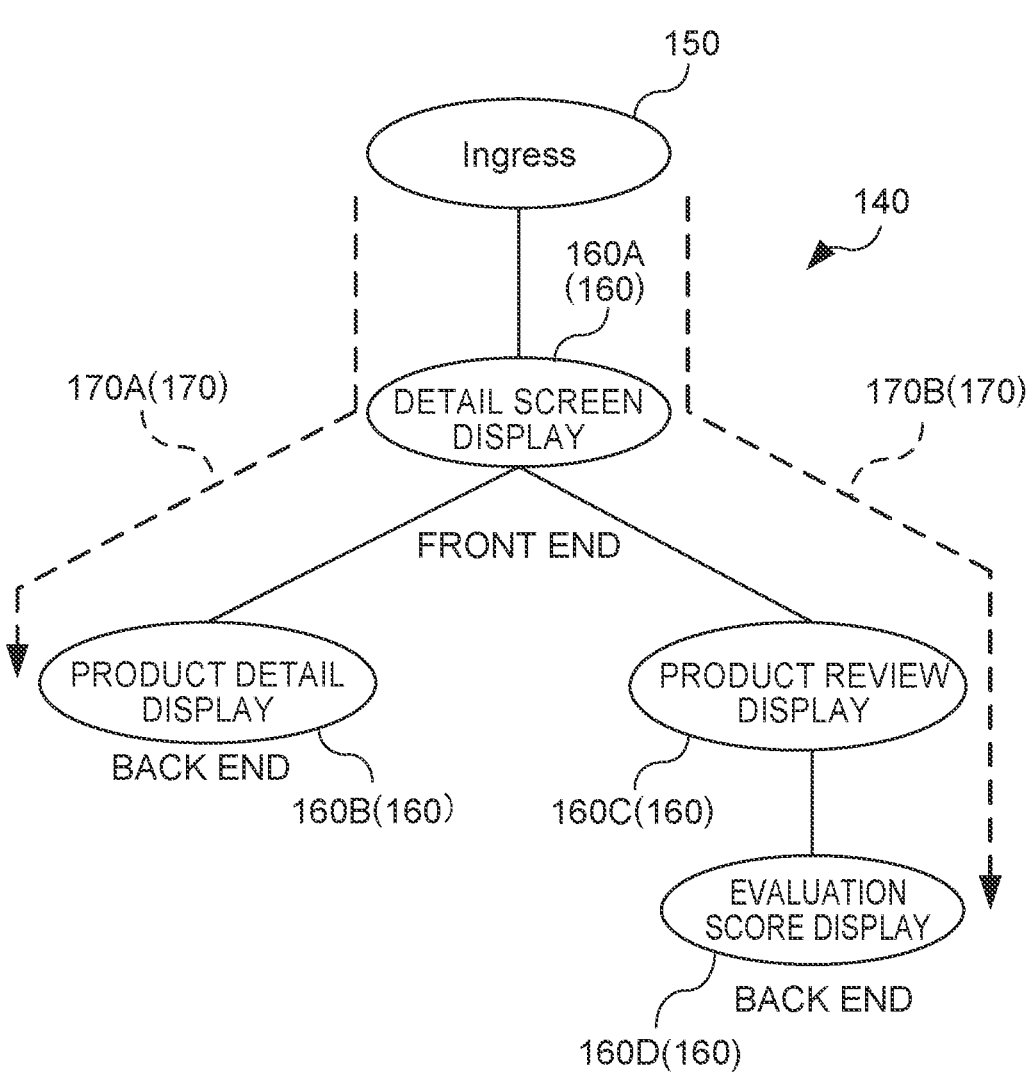
FIG. 2 is a schematic diagram illustrating an example of a network of a service configured by plural microservices according to the present exemplary embodiment.

First, explanation follows regarding a service and microservices according to the present exemplary embodiment, with reference to FIG. 1 and FIG. 2. Note that in the present exemplary embodiment, explanation follows regarding a mode in which, as service processing, a product detail screen 100 such as that illustrated in FIG. 1 is displayed in cases in which an application is executed to display a screen. As illustrated as an example in FIG. 1, the product detail screen 100 includes a product detail area 110, a product review area 120, and a product evaluation score area 130.

The service includes microservices to perform processing to display each of the product detail screen 100, the product detail area 110, the product review area 120, and the product evaluation score area 130. The service displays the product detail screen 100 as service processing by the microservices respectively executing processing in a sequence. As illustrated as an example in FIG. 2, the respective microservices are interconnected, and the processing propagates across the respective microservices so as to execute a series of processing.

FIG. 2 is a schematic diagram illustrating an example of a service network according to the present exemplary embodiment. As illustrated in FIG. 2, a service 140 is configured by plural interconnected microservices 160. For example, in cases in which the service 140 executes as processing an application to display a screen, a microservice 160A performs processing to display the product detail screen 100, and a microservice 160B performs processing to display the product detail area 110. Moreover, a microservice 160C performs processing to display the product review area 120, and a microservice 160D performs processing to display the product evaluation score area 130.

In cases in which the service 140 executes an application to display the product detail screen 100, processing propagates through the respective microservices based on service connection information and on service chains, so as to execute the above-described processing.

Note that the connection information is information regarding how the respective microservices and the like are interconnected (the network topography) within the overall service. Note that explanation follows regarding a mode in which the network of the service according to the present exemplary embodiment is a tree topology. However, there is no limitation thereto. The service network may be any network, such as a bus topology, a star topology, a ring topology, or a fully connected topology.

Moreover, the service chains are classified by a classifier of an Ingress 150, described later, from Kubernetes as described in Non-Patent Document 1. For example, when a WEB browser or application related to the service has been executed and a workload has been generated in the service 140, Ingress uses the connection information to select microservices configuring to the processing related to the workload. In other words, based on the connection information, the microservices for executing the processing related to the workload and the sequence of the microservices the workload propagates across are set in the service chains.

For example, in cases in which the service 140 illustrated in FIG. 2 executes as processing an application to display the product detail screen 100, based on the connection information the classifier of the Ingress 150 classifies the workload into a service chain 170A and a service chain 170B. The service chain 170A illustrates a flow propagating processing from the microservice 160A at a front end to the microservice 160B at a back end. The service chain 170B illustrates a flow propagating processing from the microservice 160A at a front end, via the microservice 160C, to the microservice 160D at a back end.

The service 140 executes the overall service processing by executing the processing of the respective microservices 160 configuring the service 140 based on the service chain 170A and the service chain 170B.

Hitherto, determination is made as to whether or not resources required by the microservices to perform the processing are at a set resource threshold or greater at the point in time when the workload has already propagated to the respective microservices 160, then determination is made as to whether or not to install containers, and the containers are controlled. When a workload has been generated in the service 140 (in the microservice 160A, for example), the container management device 10 according to the present exemplary embodiment predicts the number of containers required for the respective microservices 160 in the entire service 140, and controls installation of these containers.

Figure 3:
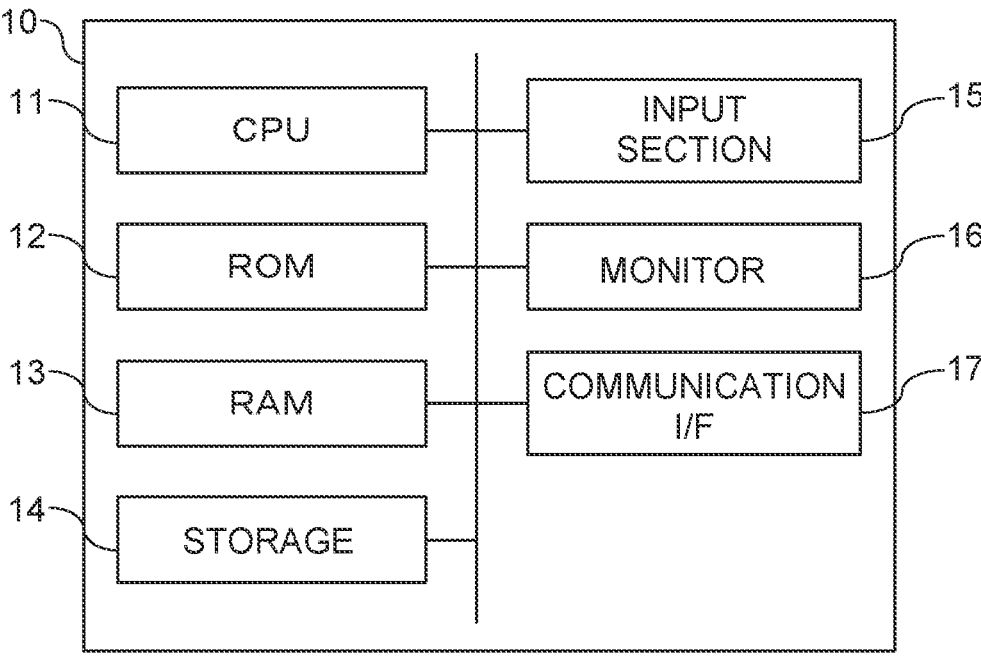
FIG. 3 is a block diagram illustrating an example of a hardware configuration of a container management device according to the present exemplary embodiment.

Next, explanation follows regarding a hardware configuration of the container management device 10 according to the present exemplary embodiment, with reference to FIG. 3. FIG. 3 is a block diagram illustrating an example of the hardware configuration of the container management device 10 according to the present exemplary embodiment.

Explanation follows regarding a mode in which the container management device 10 is a server or a terminal that performs control to substantially simultaneous install containers for the microservices of the entire service corresponding to the workload (processing load) generated in the service.

As illustrated in FIG. 3, the container management device 10 according to the present exemplary embodiment is configured including a central processing unit (CPU) 11, read only memory (ROM) 12, random access memory (RAM) 13, storage 14, an input section 15, a monitor 16, and a communication interface (communication I/F) 17. The CPU 11, the ROM 12, the RAM 13, the storage 14, the input section 15, the monitor 16, and the communication I/F 17 are connected together by a bus 18. The CPU 11 is an example of a processor.

The CPU 11 performs overall control of the entire container management device 10. The ROM 12 serves as a storage section that stores various programs, including a container management program employed in the present exemplary embodiment, data, and the like. The RAM 13 is memory employed as a workspace for executing the various programs. The CPU 11 expands a program stored in the ROM 12 into the RAM 13 and executes the program so as perform processing to install containers for the microservices corresponding to the workload generated in the service. The storage 14 may for example be a hard disk drive (HDD), a solid state drive (SSD), or flash memory. Note that the container management program and the like may be stored in the storage 14. The input section 15 is configured by a mouse, keyboard, and the like to receive text and other input. The monitor 16 displays text, images, and the like. The communication I/F 17 transmits and receives data.

Figure 4:
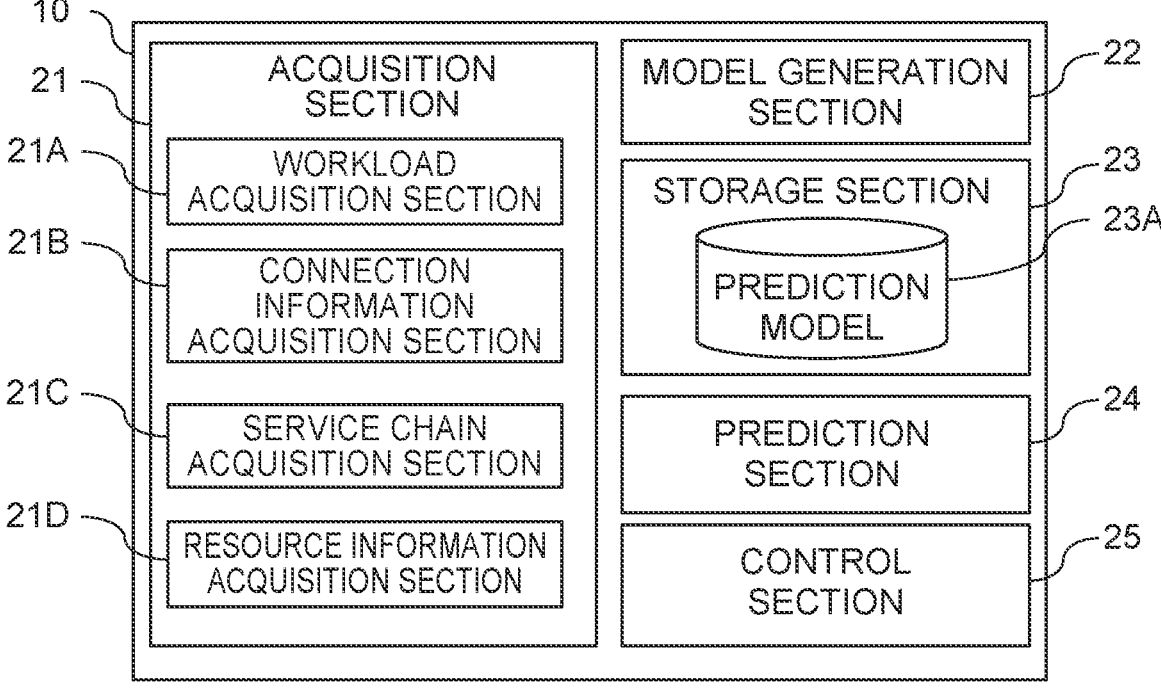
FIG. 4 is a block diagram illustrating an example of a functional configuration of a container management device according to the present exemplary embodiment.

Next, explanation follows regarding a functional configuration of the container management device 10, with reference to FIG. 4. FIG. 4 is a block diagram illustrating an example of a functional configuration of the container management device 10 according to the present exemplary embodiment.

As illustrated in FIG. 4, the container management device 10 includes an acquisition section 21, a model generation section 22, a storage section 23, a prediction section 24, and a control section 25. The acquisition section 21 includes a workload acquisition section 21A, a connection information acquisition section 21B, a service chain acquisition section 21C, and a resource information acquisition section 21D.

The CPU 11 functions as the acquisition section 21, the model generation section 22, the storage section 23, the prediction section 24, and the control section 25 by executing the container management program.

The acquisition section 21 acquires the workload currently being generated by the service, the service connection information (network topography), and the service chains related to the workload.

Specifically, the workload acquisition section 21A acquires information relating to the workload currently being generated by the service. For example, the workload acquisition section 21A may acquire a transaction amount as transactions per second (TPS) as the workload information. Note that a transaction is a series of processing in which, for example, the processing from receiving an instruction to display a screen on a WEB browser or application until the screen is displayed is defined as one unit.

The connection information acquisition section 21B acquires the service connection information (network topography).

The service chain acquisition section 21C acquires the service chains generated using the workload and the connection information for propagating the workload across the microservices.

The resource information acquisition section 21D acquires resource information, this being information indicating historical workloads of each of the microservices and resource usage.

The model generation section 22 uses the acquired resource information to generate a prediction model expressing relationships between the workload and resource usage of each microservice. Specifically, as a prediction model the model generation section 22 generates, as one example, the graphs illustrated in FIGS. 5A-5D, as a linear regression model that is predetermined for each of the microservices.

FIGS. 5A-5D contains graphs illustrating examples of relationships between workload and resource usage according to the present exemplary embodiment. In each of the graphs in FIGS. 5A-5D, the horizontal axis represents workload generated in the microservice, and the vertical axis represents the resource usage (CPU usage) corresponding to the workload.

Figure 5:
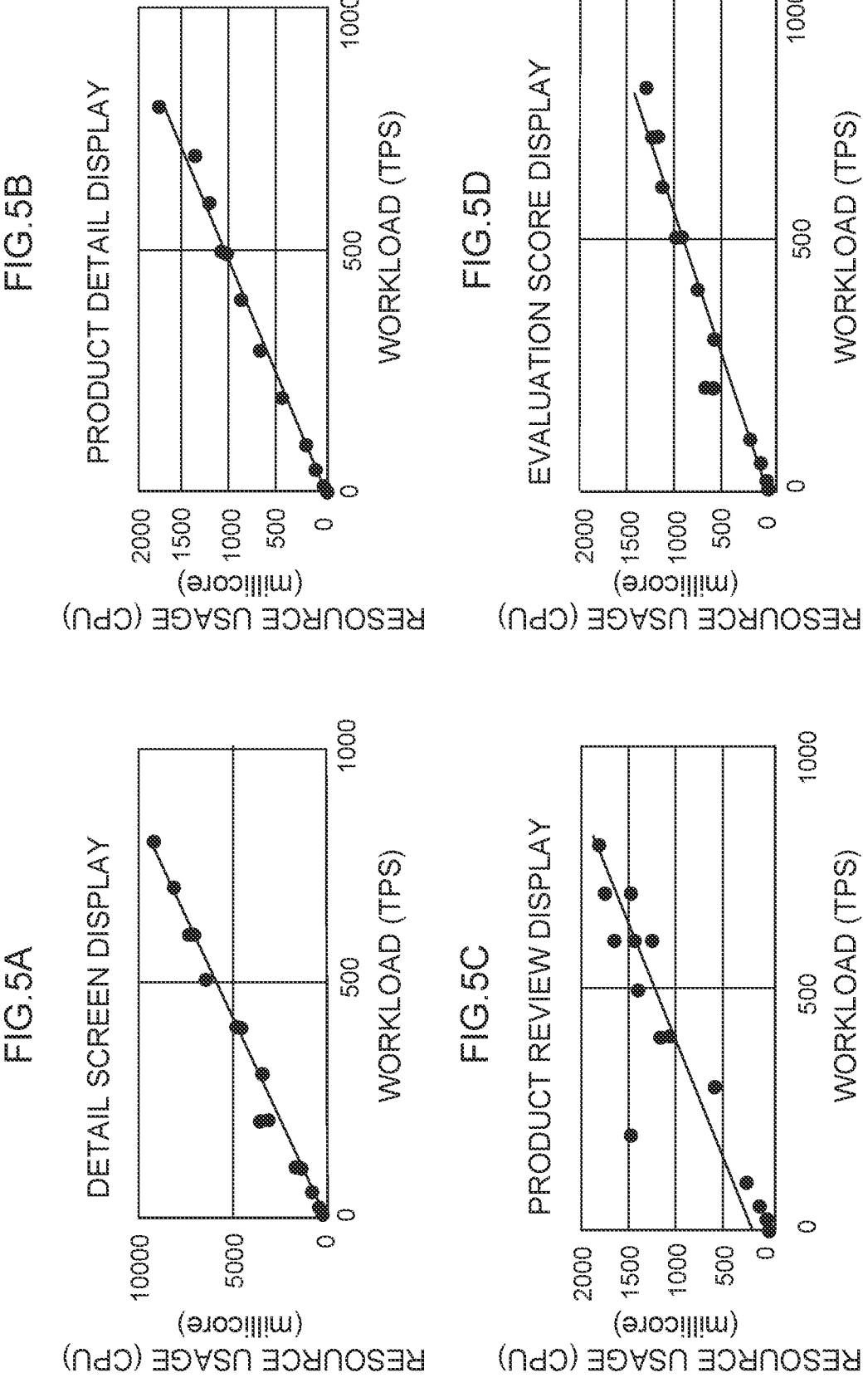
FIG. 5A is a graph relating to the microservice executing processing to display a product detail screen according to the present exemplary embodiment.
FIG. 5B is a graph relating to the microservice executing processing to display a product detail area according to the present exemplary embodiment.
FIG. 5C is a graph relating to the microservice executing processing to display a product review area according to the present exemplary embodiment.
FIG. 5D is a graph relating to the microservice executing processing to display a product evaluation score area according to the present exemplary embodiment.

FIG. 5A is a graph relating to the microservice 160A executing processing to display the product detail screen 100, and FIG. 5B is a graph relating to the microservice 160B executing processing to display the product detail area 110. Moreover, FIG. 5C is a graph relating to the microservice 160C executing processing to display the product review area 120, and FIG. 5D is a graph relating to the microservice 160D executing processing to display the product evaluation score area 130.

Note that explanation follows regarding a mode in which the model generation section 22 according to the present exemplary embodiment generates a linear regression model. However, there is no limitation thereto. The model generation section 22 may generate a non-linear regression model, may generate a regression model as determined by Gaussian process, or may generate any other form of regression model.

Figure 6:
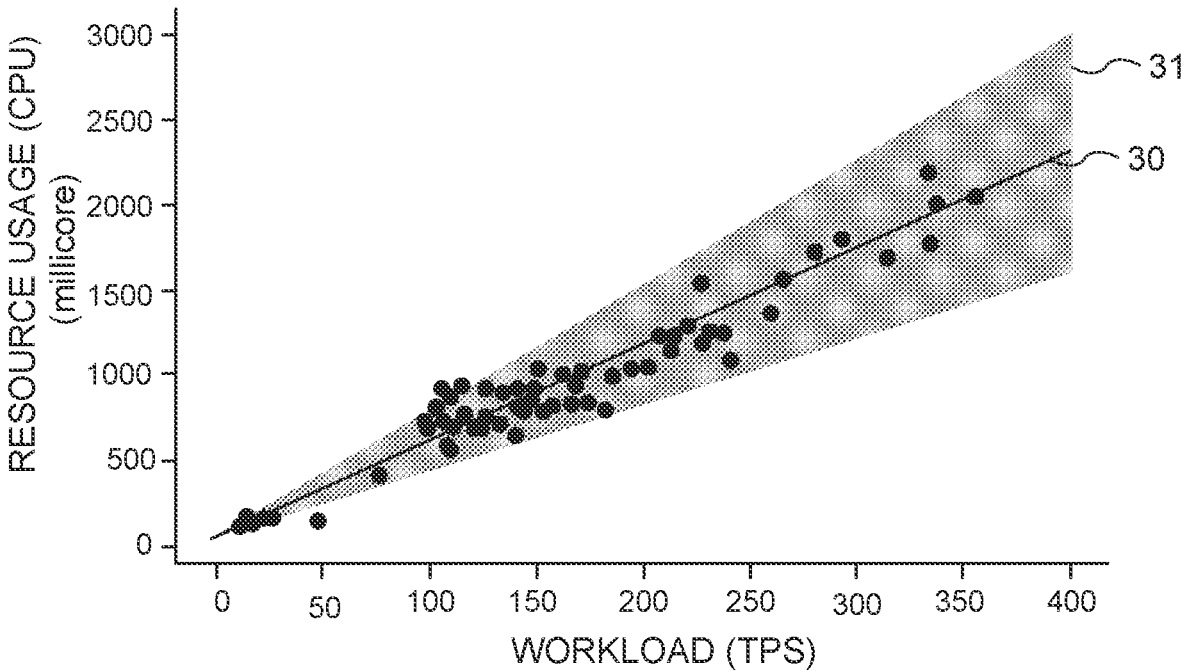
FIG. 6 is a graph illustrating an example of a relationship between processing load (workload) and resource usage to explain a Gaussian process according to the present exemplary embodiment.

For example, as illustrated in FIG. 6 as an example, a regression model by a Gaussian process is a model that enables observed values to be interpolated and predicted, even with respect to an unknown variable, by considering the correlation of the observed values against the variable. In the regression model by a Gaussian process, correlation between the variable and the observed value is generally determined by a Gaussian distribution, enabling not only discrete observed values to be interpolated continuously with certainty, but also enabling prediction error to be computed. Note that a regression line 30 in FIG. 6 represents an interpolation of observed values, and that a hatched region 31 represents prediction error.

Other prediction models may be generated using statistical values and probability distributions characteristic to the resource information. An example of another prediction model is a Bayesian model that predicts the number of containers required from statistical values and probability distributions between historical workloads and the corresponding number of containers. Another example of a prediction model is an autoregressive model that predicts the number of containers required by considering a time series of the number of containers for historically installed containers.

Explanation follows regarding a mode in which the model generation section 22 according to the present exemplary embodiment generates a predetermined prediction model. However, there is no limitation thereto. The prediction model to be generated by the model generation section 22 may be selectable. For example, a linear regression model or a regression model by a Gaussian process may be selected according to the amount of data in the resource information. Specifically, a configuration may be adopted in which the model generation section 22 generates a linear regression model in cases in which the amount of data in the acquired resource information is greater than a predetermined threshold, whereas the model generation section 22 generates a regression model by a Gaussian process in cases in which the amount of data in the resource information is no greater than the predetermined threshold.

The storage section 23 stores a prediction model 23A generated by the model generation section 22.

The prediction section 24 employs the prediction model 23A stored in the storage section 23 to predict the number of containers required for each microservice from the acquired workload, connection information, and service chains.

Specifically, from the acquired service chains, the prediction section 24 identifies the microservices to which processing will be propagated, and estimates the workload relating to each microservice using the workload and the service chain. The prediction section 24 employs the prediction model 23A stored in the storage section 23 to find a resource usage with respect to the estimated workload for each of the microservices, and predicts the number of containers required for each of the microservices.

Note that the resource usage allocated to a single container is preset. For example, in cases in which a resource usage of 100 millicores is allocated and set for a single container, then the prediction section 24 predicts the number of containers required to be 5 in cases in which a resource usage required for the microservices is found to be 500 millicores.

The control section 25 performs control to substantially simultaneously install containers corresponding to the predicted number of containers for the plural microservices. Specifically, in cases in which the number of containers currently installed for the microservices is less than the predicted number of containers, the control section 25 installs the predicted number of containers to the corresponding microservices.

Note that a case has been explained of a mode in which the control section 25 according to the present exemplary embodiment performs control to install containers in cases in which the number of containers currently installed for the microservices is less than the predicted number of containers. However, there is no limitation thereto. The control section 25 may perform control to reduce the number of containers in cases in which the number of containers currently installed for the microservices is greater than the predicted number of containers.

Control Flow

Figure 7:
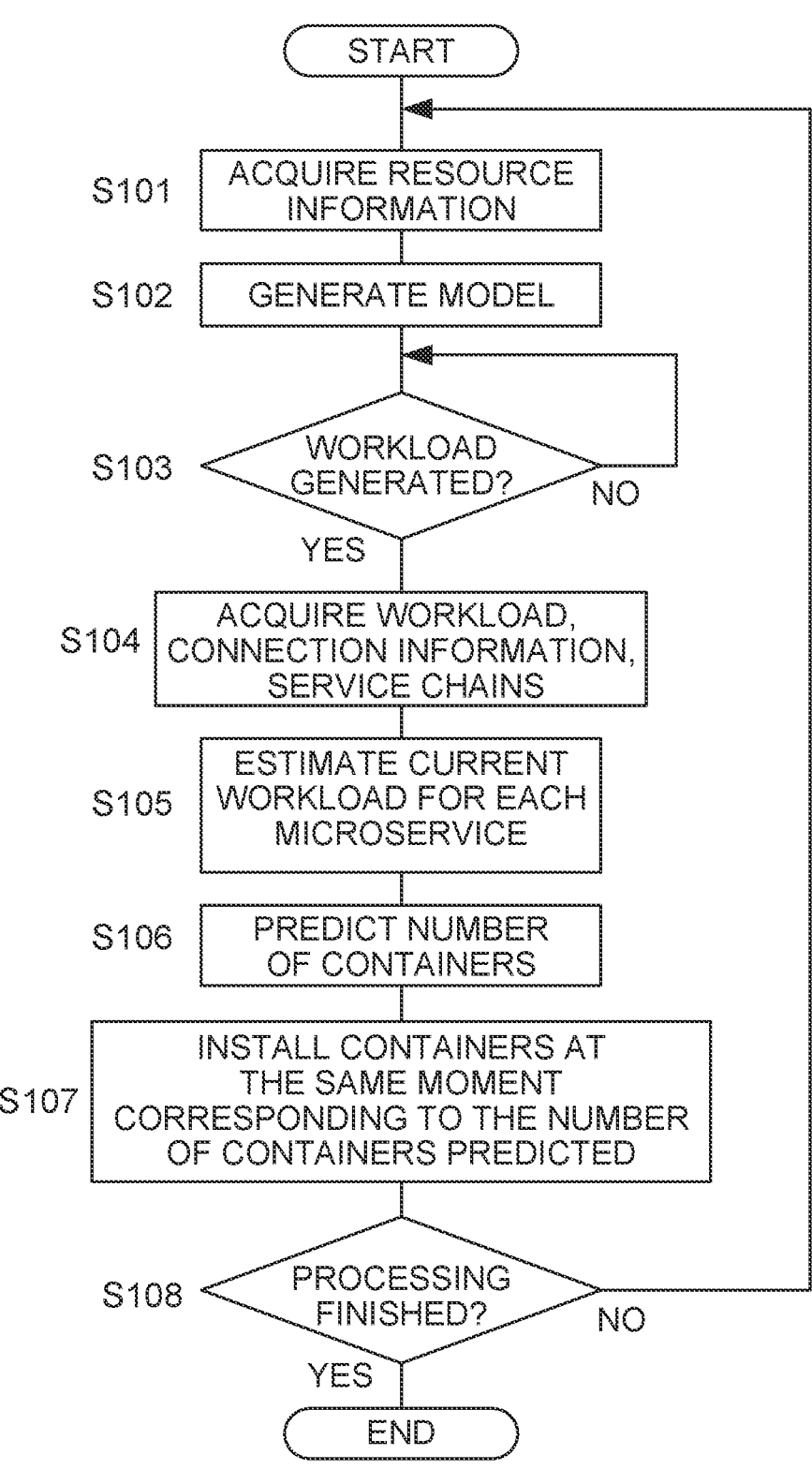
FIG. 7 is a flowchart illustrating an example of a flow of processing to predict a number of containers according to the present exemplary embodiment.

Next, explanation follows regarding operation of the container management device 10 according to the present exemplary embodiment, with reference to FIG. 7. FIG. 7 is a flowchart illustrating an example of processing to predict the number of containers according to the present exemplary embodiment. The container management program illustrated in FIG. 7 is executed when the CPU 11 reads the container management program from the ROM 12 or the storage 14 and executes the program. The container management program illustrated in FIG. 7 is, for example, executed in cases in which an instruction to predict the number of containers has been input.

At step S101, the CPU 11 acquires resource information for each of the microservices, this being historical workloads and historical resource usage.

At step S102, the CPU 11 employs the resource information to generate a prediction model expressing relationships between workload and resource usage for each of the microservices, and stores this in the storage section 23.

At step S103, the CPU 11 determines whether or not a workload has been generated in the service. The CPU 11 transitions to step S104 in cases in which a workload has been generated in the service (step S103: YES). On the other hand, in cases in which a workload has not been generated in the service (step S103: NO), the CPU 11 stands by until a workload has been generated in the service.

At step S104, the CPU 11 acquires the workload currently generated in the service, the service chains of the workload, and the service connection information.

At step S105, the CPU 11 estimates the current workload of each of the microservices using the workload, service chain, and connection information.

At step S106, the CPU 11 uses the prediction model for each of the microservices to find the resource usage, and predicts the number of containers required.

At step S107, the CPU 11 substantially simultaneously installs containers corresponding to the predicted number of containers.

At step S108, the CPU 11 determines whether or not to end processing. The CPU 11 ends processing in cases in which the processing has finished (step S108: YES). On the other hand, in cases in which processing has not finished (step S108: NO), the CPU 11 transitions to step S101 and acquires the resource information.

Summary of Exemplary Embodiment

In the container management device 10 of the present exemplary embodiment, the acquisition section 21 acquires the resource information, the workload, the service chain, and the connection information, and the model generation section 22 employs this resource information to generate a prediction model expressing relationships between workload and resource usage for each of the microservices. The container management device 10 employs the prediction model generated by the prediction section 24, and from the workload, the service chains, and the connection information predicts a number of containers corresponding to the workload for each of the microservices. The control section 25 installs the containers corresponding to the predicted number of containers. Thus, the container management device 10 according to the present exemplary embodiment predicts the number of containers required for each of the microservices at the point in time when workload is generated in the service, and substantially simultaneously installs the containers for each of the microservices.

As described above, the present exemplary embodiment enables a drop in service quality for the service overall to be suppressed, even in cases in which the workload has changed suddenly.

Remarks

Note that the present exemplary embodiment has described a mode in which containers are managed using Kubernetes. However, there is no limitation thereto. Any application may be employed as long as it is an application that controls container installation (autoscaling) such as, for example, Docker Enterprise or Mesos.

Moreover, the present exemplary embodiment has described a mode in which the resource usage is a CPU usage (millicores). However, there is no limitation thereto. The resource usage may be memory usage.

Moreover, the present exemplary embodiment has described a mode in which the resource information is acquired to generate a regression model. However, there is no limitation thereto. A prediction model may be generated using a workload estimated for each of the microservices by the prediction section 24. For example, the container management device 10 may add the workloads estimated for each of the microservices by the prediction section 24 to the resource information, and generate the prediction model therefrom. Incorporating the workloads estimated for each of the microservices by the prediction section 24 enables a prediction model to be generated that reflects the latest information.

Note that the various processing executed by the CPU 11 reading and executing software (a program) in the above exemplary embodiment may be executed by various types of processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The above described processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

In the above exemplary embodiment a mode has been explained in which each program is pre-stored (installed) on a computer-readable non-transitory storing medium. For example, the control program of the CPU 11 of the vehicle 10 is pre-stored in the ROM 12. However, there is no limitation thereto, and each program may be provided in a format storing a non-transitory storage medium such as compact disc read only memory (CD-ROM), digital versatile disc read only memory (DVD-ROM), or universal serial bus (USB) memory. Alternatively, the program may be provided in a format downloadable from an external device over a network.

What is claimed is:

1. A container management device including a processor, wherein the processor is configured to:

acquire, for a service including interconnected respective microservices installed with containers for executing processing, a historical workload relating to the service, connection information that is information relating to how the microservices are interconnected, and a service chain for propagation of respective processing related to a workload from a microservice at a front end to a microservice at a back end;

acquire resource information regarding the historical workload;

use the historical workload to generate a prediction model expressing a relationship between the workload of each of the microservices and a resource usage to find a resource usage of each of the microservices from the acquired historical workload, the acquired connection information, and the acquired service chain, the prediction model is a linear regression model when an amount of data in the resource information is greater than a predetermined threshold, and the prediction model is a Gaussian process when the amount of data in the resource information is less than or equal to the predetermined threshold;

determine whether the workload has been generated in the service;

upon determination that the workload has been generated in the service, acquire the workload currently generated in the service, the service chain of the workload, and the connection information;

estimate a current workload of each of the microservices using the acquired workload currently generated in the service, the service chain, and the connection information;

use the prediction model for each of the microservices to find the resource usage, and predict a number of containers required; and control container installation at a same moment for the respective microservices by installation with the predicted number of containers for each of the microservices.

2. The container management device of claim 1, wherein the processor is configured to:

further acquire resource information that is information regarding the historical workload and a resource usage for each of the microservices; and employ the resource information to generate the prediction model.

3. The container management device of claim 2, wherein the prediction model is a predetermined regression model, or is a regression model determined by a Gaussian process.

4. The container management device of claim 3, wherein the processor is configured to select the predetermined regression model or the regression model determined by a Gaussian process according to an amount of data in the resource information.

5. The container management device of claim 1, wherein the processor is configured to:

identify from the service chain which microservices processing will propagate through;

estimate the workload for each of the microservices; and employ the prediction model to find the resource usage from the workload estimated for each of the microservices.

6. The container management device of claim 1, wherein the connection information is a tree topology, a bus topology, a star topology, a ring topology, or a fully connected topology.

7. A non-transitory storage medium storing a container management program executable by a computer to perform processing comprising:

acquiring, for a service including interconnected respective microservices installed with containers for executing processing, a historical workload relating to the service, connection information that is information relating to how the microservices are interconnected, and a service chain for propagation of respective processing related to a workload from a microservice at a front end to a microservice at a back end;

acquiring resource information regarding the historical workload;

using the historical workload to generate a prediction model expressing a relationship between the workload of each of the microservices and a resource usage to find a resource usage of each of the microservices from the acquired historical workload, the acquired connection information, and the acquired service chain, the prediction model is a linear regression model when an amount of data in the resource information is greater than a predetermined threshold, and the prediction model is a Gaussian process when the amount of data in the resource information is less than or equal to the predetermined threshold;

determining whether the workload has been generated in the service;

upon determination that the workload has been generated in the service, acquiring the workload currently generated in the service, the service chain of the workload, and the connection information;

estimating a current workload of each of the microservices using the acquired workload currently generated in the service, the service chain, and the connection information;

using the prediction model for each of the microservices to find the resource usage, and predicting a number of containers required; and controlling container installation at a same moment for the respective microservices by installation with the predicted number of containers for each of the microservices.

* * * * *